United States Patent [19]

Akiyama

[11] 3,813,583

[45] May 28, 1974

[54] YARN BREAK DETECTION SYSTEM

[75] Inventor: Tadashi Akiyama, Yokohama, Japan

[73] Assignee: Yamatake-Honeywell Company Limited, Tokyo, Japan

[22] Filed: Jan. 29, 1973

[21] Appl. No.: 327,375

[30] Foreign Application Priority Data
Jan. 28, 1972  Japan.............................. 47/10320

[52] U.S. Cl....... 317/148.5 B, 317/DIG. 2, 307/304
[51] Int. Cl.......................................... H01h 47/32
[58] Field of Search . 317/DIG. 2, 148.5 R, 148.5 B, 317/149; 307/304

[56] References Cited
UNITED STATES PATENTS
| | | | |
|---|---|---|---|
| 2,565,500 | 8/1951 | Ingham, Jr. | 317/DIG. 2 |
| 2,826,166 | 3/1958 | Davis, Jr. | 317/2 R |
| 3,043,991 | 7/1962 | Schneider et al. | 317/DIG. 2 |
| 3,273,066 | 9/1966 | Ruhnke | 307/304 |

*Primary Examiner*—L. T. Hix
*Attorney, Agent, or Firm*—Lament B. Koontz; Trevor B. Joike

[57] ABSTRACT

A yarn break detector having a collecting electrode type sensor to which a continuously moving yarn is lightly contacted. A gate electrode of a field effect transistor is connected to the sensor and a relay circuit is connected in series to a drain electrode of the transistor. Normally, the field effect transistor of high input impedance is operated to its one condition by the collected electric charges from the continuously moving yarn. When the yarn break or cutting off occurs, the collected charges on the sensor disappear and then the field effect transistor is changed into its other condition, thereby the relay circuit produces an alarm signal.

5 Claims, 2 Drawing Figures

YARN BREAK DETECTION SYSTEM

BACKGROUND OF THE INVENTION

In the textile industry, continuously moving threads, yarns, and fibers are monitered on many processes, for example, spinning process, spooling process and weaving process, so as to ensure the smooth and uninterrupted operation thereof.

The break or cutting off of continuously moving threads, yarns, fibers or the like, must be quickly and surely detected.

Heretofore, a mechanical yarn break detector and an optical yarn break detector have been known. The mechanical detector includes a plunger on which the tension of the yarn is applied and a pair of electric contacts being actuated by said plunger in case the yarn break occurs. The optical detector ordinally comprises a light source and a light sensor for sensing the variation of quantity of receiving light from the light source via the yarn to be monitored, and produces an alarm signal when the quantity of the receiving light has reached the predetermined value. The mechanical detector is most popular because of low cost, but is extremely low in the reliability. By contrast, the optical detector is reliable but expensive. Further, such mechanical or optical detector is not applicable to the cases where the speed of the moving yarn is very high and or the diameter thereof is extremely small. In short, the desired yarn break detector with high reliability and low cost has not been obtained as yet.

After careful investigation, the inventor found the following fact. When yarns are manufactured, the yarns continuously travel through or on guide rollers, guide pins or the like as sliding therewith. Therefore a sliding contact exists therebetween and it produces surely the static electricity on the yarn due to the friction. Normally, this static electricity is excluded through the prevention process of electric charges, because it disturbs the manufacturing process and makes lower the quality of product. However, in spite of having done the prevention process, there actually remain charges on the yarn that reach the order of $10^{-8}$ to $10^{-9}$ Coulomb/m. Ordinarily, the yarn speed in a manufacturing machine is of the order of 1,000 m/minute to 5,000 m/minute; consequently, it is considered that currents to be collected from the charged yarn will reach the order of $1.7 \times 10^{-7}$ A to $8.3 \times 10^{-7}$ A. It has been confirmed that this consideration is proven by way of the test.

SUMMARY OF THE INVENTION

The present invention relates to an electronic yarn break detector which bases on the above fact that the yarn possesses charges thereon of the order of $10^{-8}$ to $10^{-9}$ Coulomb/m at least.

The present yarn break detector comprises a collecting electrode type sensor, a field effect transistor with high input impedance and a relay circuit. A continuously moving yarn to be monitored travels while only lightly contacting the collecting electrode type sensor. A gate electrode of the field effect transistor is connected to the sensor and the relay circuit is connected in series to a drain electrode of the field effect transistor. Normally, the field effect transistor is operated to its first condition by the collected electric charges from the continuously moving yarn, and then the relay circuit is also actuated its first condition showing the yarn is normal.

When the yarn break or cutting off occurs, the collected charges disappear from the sensor, consequently the gate currents of the field effect transistor disappear and the transistor is quickly changed into its second condition, thereby the relay circuit produces an alarm signal.

DESCRIPTION OF THE PREFERRED EMBODIMENT

Figure 1:
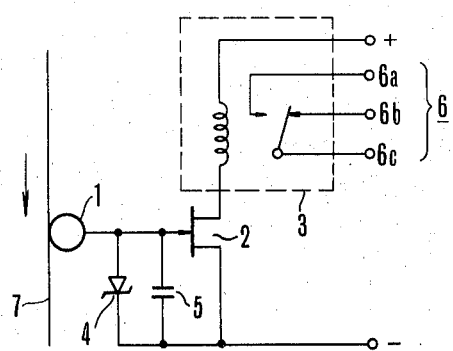
FIG. 1 is a circuit diagram of one embodiment of the yarn break detector according to the present invention.

In FIG. 1, a collecting electrode type sensor 1 is arranged to lightly contact the continuously moving yarn 7 so as to collect electric charges on the yarn 7. A field effect transistor of N channel junction type 2 is utilized in this invention as an electronic switch of high input impedance or an input circuit of a high input impedance relay circuit. Said field effect transistor (hereinafter referred to as FET) 2 has its gate electrode, source electrode and drain electrode connected to the collecting electrode type sensor 1, the negative voltage terminal and one of the terminals of the relay circuit 3 respectively. Another terminal of the relay circuit 3 is connected to the positive voltage terminal. Said terminals of the relay circuit 3 correspond to a pair of end terminals of a relay winding in this embodiment. Said relay circuit 3 further has a pair of fixed contacts connected to terminals 6a and 6b respectively and a movable contact connected a terminal 6c. These terminals 6a, 6b and 6c are the monitoring terminals to which a monitor or an alarm is connected. A Zener diode 4 is connected between the gate electrode of the FET 2 and the negative voltage terminal. A capacitor 5 is provided for smoothing irregular ripples of the volume of charges and reducing the noises induced by other apparatus or machine, and is connected in parallel to the Zener diode 4. The capacitance of the capacitor 5 is suitably selected for its influences on the detection response speed of the yarn break or cutting off. It is to be noted that the FET 2 of N channel junction type is only used as an switch for the negative charge detection.

Figure 2:
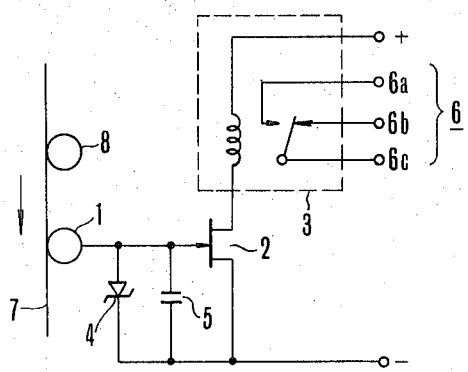
FIG. 2 is a circuit diagram of another embodiment of the yarn break detector according to the present invention.

In FIG. 2, a charging facilitating means is provided. Said means is accomplished by locating a charging facilitating body 8 such as a glass body in front of said collecting electrode type sensor 1 at the traveling direction of the yarn 7. Said charging facilitating body 8 also lightly contacts the continuously moving yarn 7. The collecting electrode type sensor is easily obtained because there are many metal guides in the machine that lightly contact the continuously moving yarn. The inventor realized it as the lappet guide by only insulating it from the machine body. In short, the collecting electrode type sensor 1 may be the conductive body at least.

In operation, the collecting electrode type sensor 1 collects the charges on the yarn 7. The collected charges are of the order of $10^{-8}$ to $10^{-9}$ Coulomb/m and the corresponding collected currents are of the order of $1.7 \times 10^{-7}$ to $8.3 \times 10^{-7}$ A in case the yarn speeds are of the order of 1,000 m/minute to 5,000 m/minute. The gate cut-off currents of the junction type FET are of the order of $10^{-9}$ A. Consequently, at the normal condition, the FET 2 is operated into its cut-off condition by the collected charges which are larger than the gate cut-off currents of the FET 2 with the absolute comparison. Thus the relay winding of the relay is not energized and the movable contact thereof is placed on the fixed contact connected to the terminal 6b, thereby the relay circuit 6 shows the normal condition of the yarn 7.

If the yarn 7 cut off or broke, the collected currents from the sensor 1 quickly extinguish below the gate cut-off currents of the FET 2, and then the FET 2 instantly transfers its condition from CUT-OFF to ON. Consequently the drain currents of the FET 2 flow from the positive voltage terminal through the relay winding of the relay circuit 3 and the drain to source circuit of the FET 2 to the negative voltage terminal and energize the relay winding so that the movable contact switches from the N.C. contact to the N.O. contact connected to the terminal 6a, thereby producing an alarm signal which shows the yarn break or cutting off condition occured.

If an overlevel static electricity is produced on the sensor 1, overlevel currents flow through the Zener diode 4. That is, the Zener diode 4 acts as a protective limiter against the overlevel input and such overlevel static electricity occurs in case, for example, when the operator cleans the surface of the sensor 1.

The charging facilitating body 8 shown in FIG. 2 provides stable and increasing collected currents and therefore strengthens the reliability of detection. Polarity of charging such as positive and negative charging is dependent on the kinds of yarn and the amount of charges is also dependent thereon. When it is not advantageous from the standpoint of cost to design detectors commonly usable for all yarns, the detectors utilizing the charge facilitating body 8 are especially effective instead of natural charging.

Though the embodiment as above described is concerned with a detector for a negatively chargeable yarn in which N channel junction type FET 2 is used, the detector can be used for a positively chargeable yarn by replacing said N channel junction type FET by a P channel junction type FET.

It is to be understood that this invention is not limited to the embodiment thereof as described and shown, but can be subjected to various changes and modifications.

As above described, the yarn break detector according to this invention provides a new and noble electronic detector which is of very simple structure, of high reliability and inexpensive.

The embodiments of the invention in which an exclusive property or right is claimed are defined as follows:

1. A yarn break detector comprising a collecting electrode type sensor to which a continuously moving yarn is lightly contacted, a field effect transistor of high input impedance having gate, source and drain electrodes, said field effect transistor having its gate electrode connected to said sensor and its source electrode connected to a negative voltage terminal of a source, a capacitor connected between the gate and source electrodes of the field effect transistor and a relay circuit connected between a positive voltage terminal of the source and the drain electrode of the field effect transistor.

2. A yarn break detector as defined in claim 1 further having a overlevel limiter connected in parallel to the capacitor.

3. A yarn break detector comprising a collecting electrode type sensor to which a continuously moving yarn is lightly contacted, a field effect transistor having gate, source and drain electrode, means connecting said gate electrode to said sensor, a source of direct current, output means, means connecting said source, said transistor and said output means together whereby said output means is controlled in response to a breakage of said yarn.

4. The yarn break detector of claim 3 wherein said output means comprises a relay circuit.

5. The yarn break detector of claim 3 further comprising a charging facilitating body lightly contacting the yarn ahead of said sensor.

* * * * *